US011029731B1

(12) United States Patent
Carnevali

(10) Patent No.: US 11,029,731 B1
(45) Date of Patent: Jun. 8, 2021

(54) CRADLES AND CASES FOR MOBILE DEVICES INCORPORATING GUIDE ELEMENTS OR MODULAR COMPONENTS AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 16/853,565

(22) Filed: Apr. 20, 2020

(51) Int. Cl.
*G06F 1/16* (2006.01)
*H04B 1/3888* (2015.01)
*H04M 1/04* (2006.01)

(52) U.S. Cl.
CPC .......... *G06F 1/1632* (2013.01); *G06F 1/1679* (2013.01); *H04B 1/3888* (2013.01); *H04M 1/04* (2013.01)

(58) Field of Classification Search
CPC .................................................. G06F 1/1632
See application file for complete search history.

(56) References Cited

U.S. PATENT DOCUMENTS

| | | | |
|---|---|---|---|
| 809,977 | A | 1/1906 | O'Brien |
| 1,786,459 | A | 7/1926 | Simons |
| 2,495,552 | A | 1/1950 | Schmitz |
| 2,549,917 | A | 4/1951 | Millbrandt |
| 2,565,939 | A | 8/1951 | Wriston |
| 2,612,947 | A | 10/1952 | Jenks |

(Continued)

FOREIGN PATENT DOCUMENTS

| | | |
|---|---|---|
| CN | 101674096 | 3/2010 |
| CN | 202268924 | 6/2012 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Hsinchun Liao
(74) *Attorney, Agent, or Firm* — Branch Partners PLLC; Bruce E. Black

(57) ABSTRACT

A case for a mobile device can include a cover defining a cavity for receiving and holding the mobile device and including a guide protrusion extending away from the cavity and a remainder of the cover. A docking cradle can include a cradle body to receive a mobile device disposed in the case and a latch that is slidable to be at least partially disposed over the cover of the case to retain the mobile device and case received in the docking cradle. A portion of the latch defines a guide indentation having a shape complementary to the guide protrusion of the cover to laterally guide the case and mobile device into the docking cradle. Additionally or alternatively, a modular docking cradle can have a device-specific module, a universal retention module, and a universal connector module.

20 Claims, 10 Drawing Sheets

(56) References Cited

U.S. PATENT DOCUMENTS

| | | |
|---|---|---|
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 8/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,572,176 B2 | 6/2003 | Davis et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,203,058 B2 * | 4/2007 | Hong .................. G06F 1/162 248/917 |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| 7,889,489 B2 | 2/2011 | Richardson et al. |
| 7,901,216 B2 | 3/2011 | Rohrbach et al. |
| 7,907,394 B2 | 3/2011 | Richardson et al. |
| 8,061,516 B2 | 11/2011 | Carnevali |
| 8,074,951 B2 | 12/2011 | Carnevali |
| 8,087,939 B2 | 1/2012 | Rohrbach et al. |
| 8,099,138 B2 | 1/2012 | Piekarz |
| 8,172,580 B1 | 5/2012 | Chen et al. |
| 8,177,560 B2 | 5/2012 | Rohrbach et al. |
| 8,183,825 B2 | 5/2012 | Sa |
| 8,224,408 B2 | 7/2012 | Tomasini et al. |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,483,758 B2 | 7/2013 | Huang |
| 8,497,753 B2 | 7/2013 | DiFonzo et al. |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,891,800 B1 | 11/2014 | Shaffer |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,026,187 B2 | 5/2015 | Huang |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,172,781 B1 | 10/2015 | Goldstein |
| 9,356,267 B1 | 5/2016 | To et al. |
| 9,647,474 B2 | 5/2017 | Fathollahi et al. |
| 2004/0108348 A1 | 6/2004 | Barnes |
| 2005/0189354 A1 | 9/2005 | Heather et al. |
| 2006/0058073 A1 | 3/2006 | Kim |
| 2006/0175766 A1 | 8/2006 | Carnevali |
| 2009/0160400 A1 | 6/2009 | Woud |
| 2009/0314400 A1 | 12/2009 | Liu |

(56) References Cited

U.S. PATENT DOCUMENTS

| | | |
|---|---|---|
| 2012/0018325 A1 | 1/2012 | Kim |
| 2012/0043235 A1 | 2/2012 | Klement |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2014/0347000 A1* | 11/2014 | Hamann ............... G06F 1/1626 320/103 |
| 2015/0055289 A1* | 2/2015 | Chang ................... G06F 1/1632 361/679.43 |
| 2015/0146401 A1 | 5/2015 | Su et al. |
| 2015/0189780 A1 | 7/2015 | Su et al. |
| 2017/0227987 A1 | 8/2017 | Carnevali et al. |

FOREIGN PATENT DOCUMENTS

| | | |
|---|---|---|
| CN | 204408423 | 6/2015 |
| JP | 2004-349969 | 12/2004 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico® PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

* cited by examiner

CRADLES AND CASES FOR MOBILE DEVICES INCORPORATING GUIDE ELEMENTS OR MODULAR COMPONENTS AND METHODS OF MAKING AND USING

FIELD

The present invention is directed to cases or cradles for a mobile device. The present invention is also directed to a case for a mobile device and a cradle which have guide elements for guiding the case into the cradle, as well as a modular cradle and methods of making and using the cases and cradles.

BACKGROUND

Mobile devices, such as smartphones, cellular or mobile phones, tablets, personal data assistants, and other portable devices, are now ubiquitous. Cases are typically used to protect the mobile device.

BRIEF SUMMARY

One embodiment is an arrangement that includes a case for a mobile device and a docking cradle. The case includes an exterior; a cover defining a cavity for receiving and holding the mobile device and including a guide protrusion extending away from the cavity and a remainder of the cover; and an adapter disposed at least partially within the cover. The adapter includes first contacts disposed on the exterior of the case, a male plug extending into the cavity defined by the cover for insertion into a female socket of the mobile device, and a second contacts disposed on the male plug and electrically coupled to the first contacts of the adapter. The docking cradle includes a cradle body configured to receive a mobile device disposed in the case; a connector disposed on the cradle body, configured to engage the case, and including contacts configured to electrically couple to the first contacts of the adapter of the case; a latch housing coupled to the cradle body; and a latch that is slidable relative to the latch housing between a retention position and an unloading/loading position. The latch, in the retention position, is configured to be at least partially disposed over the cover of the case to retain the mobile device and case received in the docking cradle. The latch, in the unloading/loading position, is configured to permit receiving the mobile device into, or removing the mobile device from, the cradle body. A portion of the latch defines a guide indentation having a shape complementary to the guide protrusion of the cover to laterally guide the case and mobile device into the docking cradle when in the unloading/loading position.

In at least some embodiments, the guide protrusion has a hemispherical, square, rectangular, hexagonal, octagonal, half-oval, right triangular, equilateral triangular, or isosceles triangular shape. In at least some embodiments, the docking cradle further includes a biasing element disposed in the latch housing to bias the latch in the retention position. In at least some embodiments, the docking cradle further includes a locking mechanism disposed in the latch housing and configured for locking the latch in the retention position. In at least some embodiments, the docking cradle further includes a biased plunger extending from the cradle body and configured to push a mobile device and case received in the cradle body toward the latch.

In at least some embodiments, the cradle body includes a frame, a plurality of guide members extending from the frame to guide the receiving of the mobile device, a back plate spaced apart from the frame, and sidewalls extending from the frame to the back plate, wherein the frame has a length and width selected based on a length and width of the mobile device. In at least some embodiments, the docking cradle further includes a fan disposed on the back plate.

In at least some embodiments, the connector of the docking cradle is a female connector. In at least some embodiments, the cover and adapter of the case form a male structure that extends from a remainder of the case, where the first contacts are disposed on the male structure.

In at least some embodiments, the cover of the case is flexible and made from at least one elastomeric polymer. In at least some embodiments, the cover of the case includes a flexible covering and a rigid frame disposed at least partially within the flexible covering.

Another embodiment is a modular docking cradle for a mobile device. The modular docking cradle including a device-specific module, a universal retention module, and a universal connector module. The device-specific module is configured for receiving the mobile device and includes a frame, guide members extending from the frame to guide the receiving of the mobile device, a back plate spaced apart from the frame, and sidewalls extending from the frame to the back plate, where the frame has a length and width selected based on a length and width of the mobile device. The universal retention module is removably attached or removably attachable to the device-specific module and includes a body and a latch that is slidable relative to the body between a retention position and an unloading/loading position. The latch, in the retention position, is configured to engage and retain a mobile device or case disposed on the mobile device, received in the device-specific module. The latch, in the unloading/loading position, is configured to permit receiving the mobile device into, or removing the mobile device from, the device-specific module. The universal retention module is configured to be removably attached to any of a plurality of different device-specific modules of different length or different width or both different length and different width. The universal connector module is removably attached or removably attachable to the device-specific module and includes a body and a device connector coupled to the body. The device connector includes contacts configured for electrically coupling to contacts of a connector on the mobile device or on a case disposed on the mobile device. The universal connector module is configured to be removably attached to any of a plurality of different device-specific modules of different length or different width or both different length and different width.

In at least some embodiments, the modular docking cradle further includes a biasing element disposed in the latch housing to bias the latch in the retention position. In at least some embodiments, the modular docking cradle further includes a locking mechanism disposed in the latch housing and configured for locking the latch in the retention position. In at least some embodiments, the modular docking cradle further includes a biased plunger extending from the cradle body and configured to push a mobile device and case received in the cradle body toward the latch. In at least some embodiments, the modular docking cradle further includes a fan disposed on the back plate.

In at least some embodiments, the device connector of the universal connector module is a female connector. In at least some embodiments, the latch defines a guide indentation to guide the receiving of the mobile device. In at least some embodiments, the frame has a first end, a second end opposite the first end, a first side extending from the first end to the second end, and a second side extending from the first end to the second end and opposite the first side, the device-specific module, wherein at least one of the guide members extends from the first side and at least another one of the guide members extends from the second side. In at least some embodiments, the universal retention module is removably attached or removably attachable to the first end of the frame and the universal connector module is removably attached or removably attachable to the second end of the frame.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to cases or cradles for a mobile device. The present invention is also directed to a case for a mobile device and a cradle which have guide elements for guiding the case into the cradle, as well as a modular cradle and methods of making and using the cases and cradles.

Figure 1:
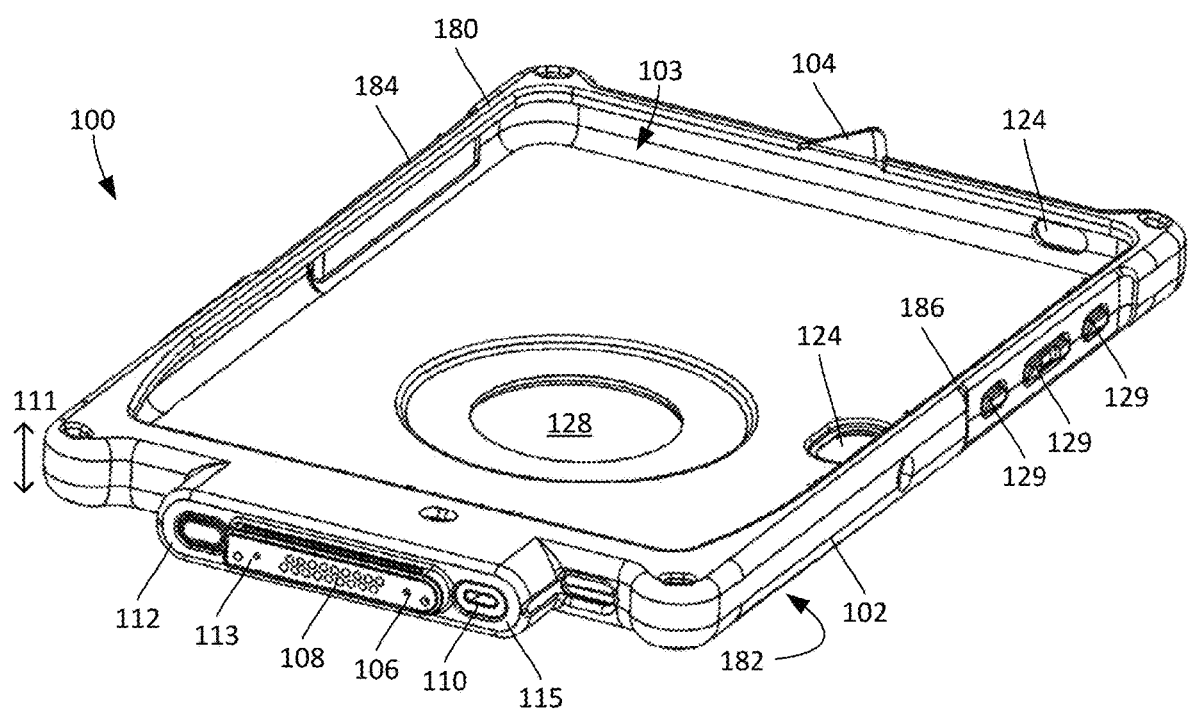
FIG. 1 is a schematic perspective view of a first embodiment of a case for a mobile device, according to the invention.

FIG. 1 illustrates one embodiment of a case 100 for a mobile device, such as a cellular or mobile phone, a smartphone, a tablet, a personal data assistant, or any other suitable mobile device. The case 100 includes a cover 102 which defines a cavity 103 to receive the mobile device, a guide protrusion 104 that extends from the cover, and an adapter 106. The adapter 106 includes first contacts 108 disposed on an exterior of the case 100 for coupling to an external device (not shown), such as a docking cradle, a male plug 109 (FIG. 2B) for insertion into a female socket of the mobile device, and second contacts 142 (FIGS. 6A and 6B) disposed on the male plug so that the adapter can carry power or data or both between the external device and the mobile device. In the illustrated embodiment of FIG. 1, regions 124 are open.

The guide protrusion 104 extends from the cover 102 of the case 100 to facilitate guiding the case 100 (and mobile device received in the case) into a docking cradle with a complementary guide, as described below. The guide protrusion 104 can have any suitable shape. For example, the portion of the guide protrusion 104 that extends beyond the cover 102 can have a cross-sectional shape (as viewed from the front of the case 100) that is regular or irregular and can be, for example, a hemisphere, square, rectangle, hexagon, octagon, half-oval, right triangle, equilateral triangle, or isosceles triangle, or any other suitable cross-sectional shape or multiple elements with the same cross-sectional shape (e.g., multiple hemispheres in a row) or different cross-sectional shapes (e.g., a square flanked by two hemispheres.)

The guide protrusion 104 can be a solid element or partially or fully hollow. The guide protrusion 104 can be made of the same material as the cover 102 or can be made of a different material from the cover. The guide protrusion 104 can be formed (e.g., molded) with the cover 102 or attached to the cover (e.g., by insert molding or using an adhesive or the like).

The guide protrusion 104 can extend the full thickness 111 of the cover 102 or extend only partially along the thickness of the cover 102. In at least some embodiments, the guide protrusion 104 is flush with a front surface 180 of the cover 102 or may extend above the front surface, as illustrated in FIG. 1. In other embodiments, the guide protrusion 104 is flush with a back surface 182 of the cover 102 or extend beyond the back surface. In other embodiments, the guide protrusion 104 may be inset relative to one, or both, of the front surface or the back surface of the cover.

In at least some embodiments, the guide protrusion 104 is centered relative to the lateral sides 184, 186 of the cover 102. In other embodiments, the guide protrusion 104 is disposed off-center relative to the lateral sides 184, 186 of the cover. In at least some embodiments, the guide protrusion 104 is disposed on a side of the cover 102 opposite a side on which the first contacts 108 are disposed, as illustrated in FIG. 1. In other embodiments, the guide protrusion 104 can be disposed on the same side of the cover 102 as the first contacts 108 or on a side 184, 186 that is adjacent to the side of the cover on which the first contacts are disposed. The illustrated embodiment of FIG. 1 includes a guide protrusion 104 on one side of the cover 102. Other embodiments may include a guide protrusion on two, three, or four sides of the cover 102.

U.S. Pat. Nos. 9,195,279; 9,331,444; 9,529,387; 9,602,639; 9,632,535; 9,706,026; 10,050,658; 10,054,984; 10,389,399; 10,454,515; and 10,630,334 and U.S. patent application Ser. No. 16/853,544 (entitled "Cases for Mobile Devices with a Flexible Covering and Rigid Frame or with two different Connector Arrangements and Methods of Making and Using" and filed on even date herewith), all of which are incorporated herein by reference in their entireties, disclose a variety of cases 100 that can be modified to include the guide protrusion 104.

Optionally, the adapter 106 and the cover 102 forms a first male structure 112 extending away from the cavity 103. Optionally, the first male structure 112 also includes a second male structure 113 extending out of a base 115 of the first male structure 112. In at least some embodiments, the first male structure 112 or second male structure 113 (or both) are configured for coupling to a female connector (not shown) or any other suitable connector of the external device. The adapter optionally includes a female connector 110, such as a USB-A, USB-B, USB-C, Micro-USB, Mini-USB, or Lightning connector or the like.

The cover 102 can be made of any suitable material including any suitable polymeric material. The cover 102 can be made of a flexible material (for example, thermoplastic elastomeric polymer materials, other suitable flexible or elastomeric polymer materials, or the like or any combination thereof) or rigid material or any combination thereof. For example, flexible covers that can be modified to include a guide protrusion 104 are described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties.

Figure 2A:
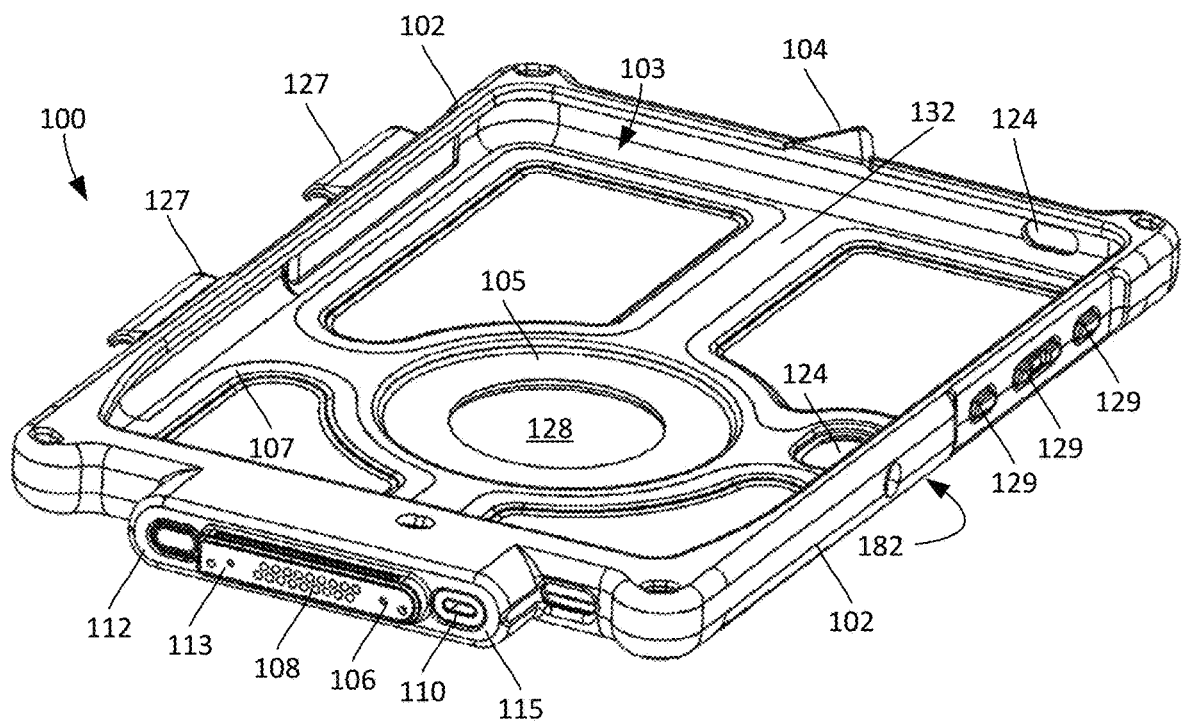
FIG. 2A is a schematic perspective view of a second embodiment of a case for a mobile device, according to the invention.
Figure 2B:
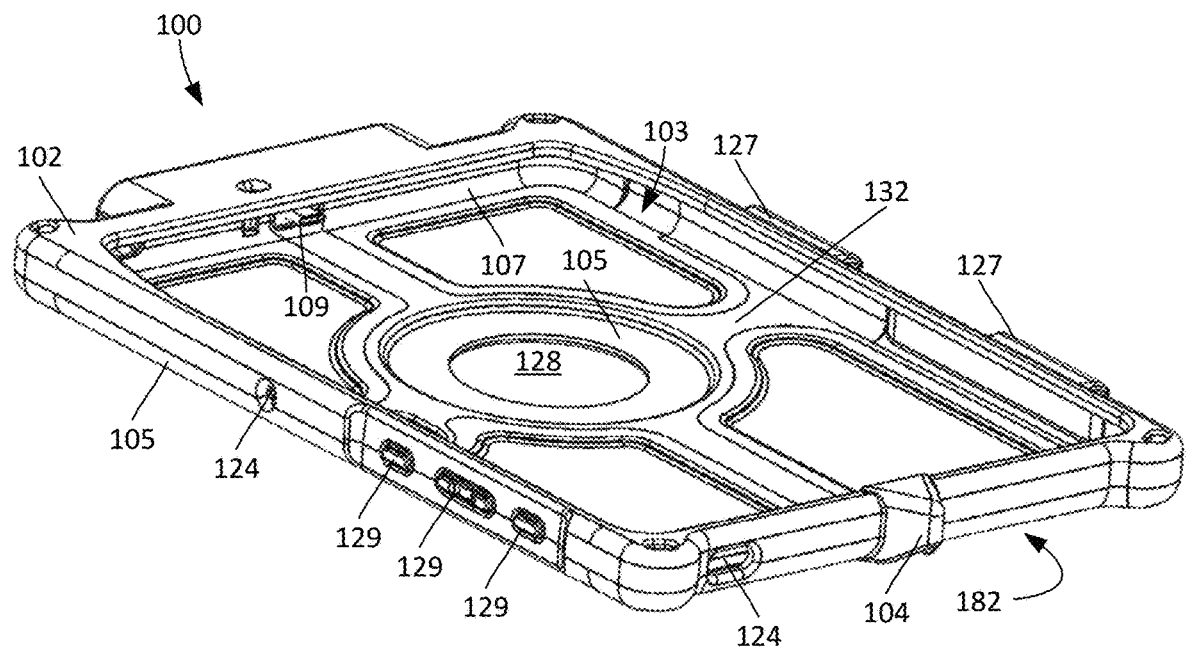
FIG. 2B is a schematic perspective view of the case of FIG. 2A from a different angle, according to the invention.

FIGS. 2A and 2B illustrate a case 100 with a cover 102 that includes a flexible covering 105 and a rigid frame 107 disposed at least partially within the flexible covering. The adapter 106 is disposed at least partially within the flexible covering and the rigid frame. The terms "flexible" and "rigid", when used in the context of "flexible covering" and "rigid frame", are intended to be relative to each other, such that the flexible covering feels more flexible, as judged by an average adult user, than the rigid frame and the rigid frame is more rigid, as judged by the average adult user, than the flexible cover. Further details regarding such cases can be found in U.S. patent application Ser. No. 16/853,544 (entitled "Cases for Mobile Devices with a Flexible Covering and Rigid Frame or with two different Connector Arrangements and Methods of Making and Using" and filed on even date herewith), which is incorporated herein by reference in its entirety. In the illustrated embodiment of FIGS. 2A and 2B, regions 124, 128 are open.

When the mobile device is received in the case 100, the cover 102 is arranged to cover at least a portion of all the side surfaces of the mobile device and to extend over at least a portion (or all) of the peripheral edges of the front and back surfaces of the mobile device to hold the mobile device in the case and to provide protection to the mobile device. In at least some embodiments, the cover 102 includes one or more curved extensions 127 (FIGS. 2A and 2B) to receive and hold a stylus or other device. Optionally, the cover 102 can include one or more soft buttons 129 that are positioned in the flexible covering to coincide with positions (or possible positions) of buttons on the mobile device. The soft buttons 129 are arranged so that depression of the soft buttons with sufficient force results in depression of the buttons of a mobile device received in the case 100. The cover 102 can also include one or more openings 124 to provide access to a speaker, a microphone, a camera, a light, a jack, or the like on the mobile device.

Figure 3A:
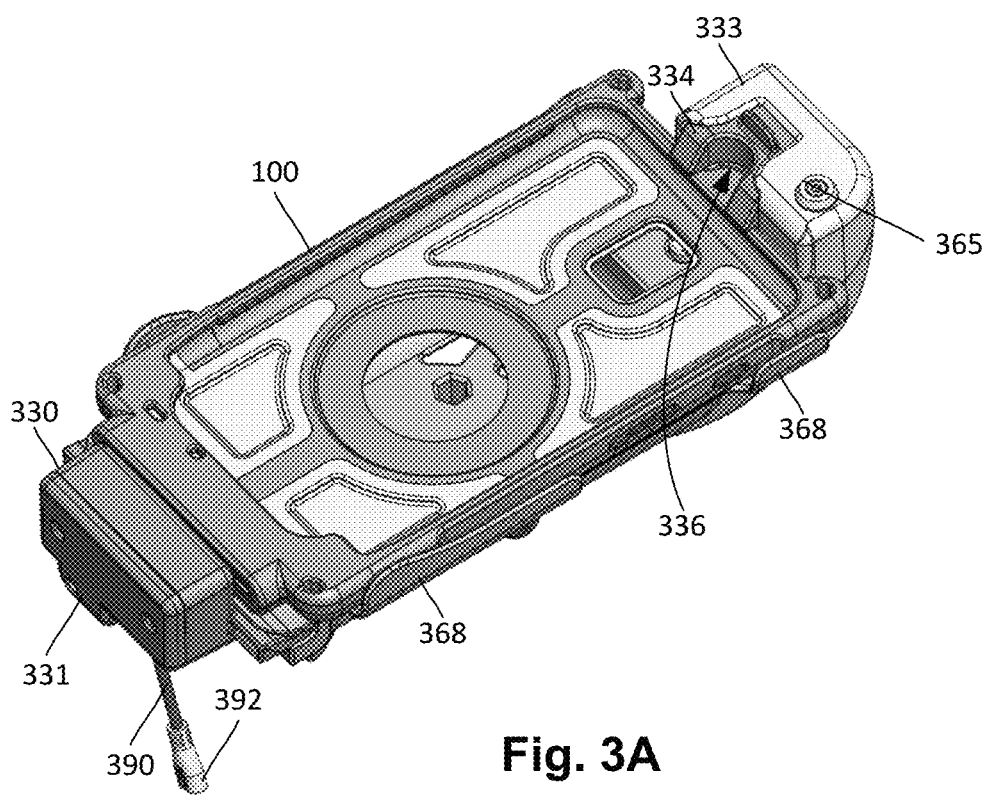
FIG. 3A is a schematic perspective front view of one embodiment of a case in a docking cradle, according to the invention.
Figure 3B:
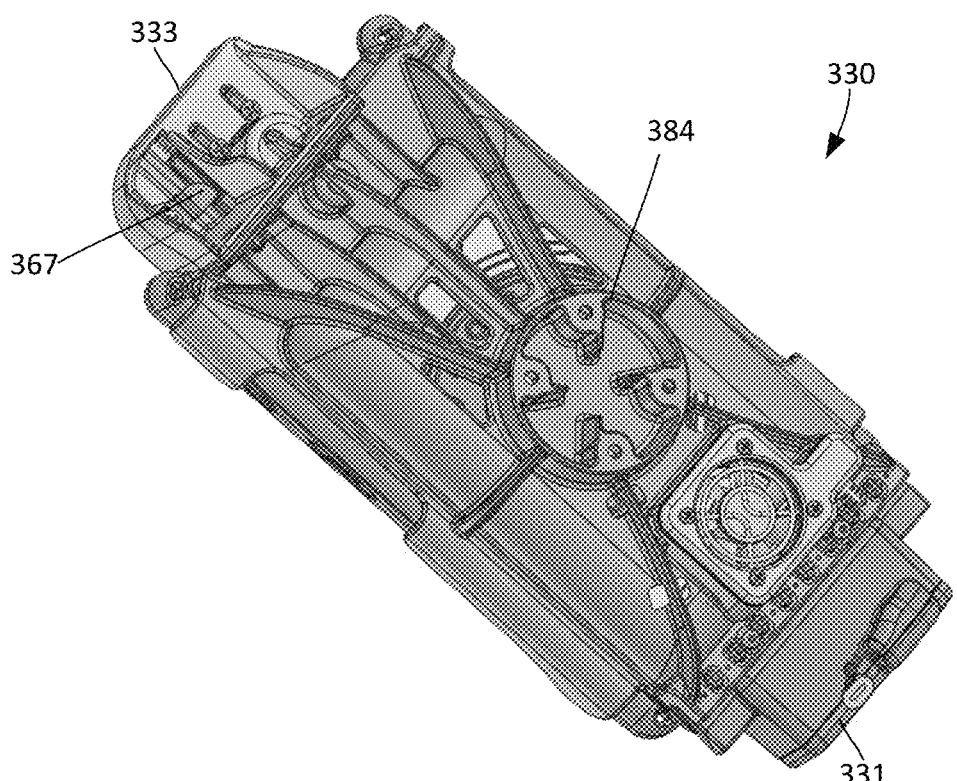
FIG. 3B is a schematic perspective back view of the case and cradle of FIG. 3A, according to the invention.
Figure 3C:
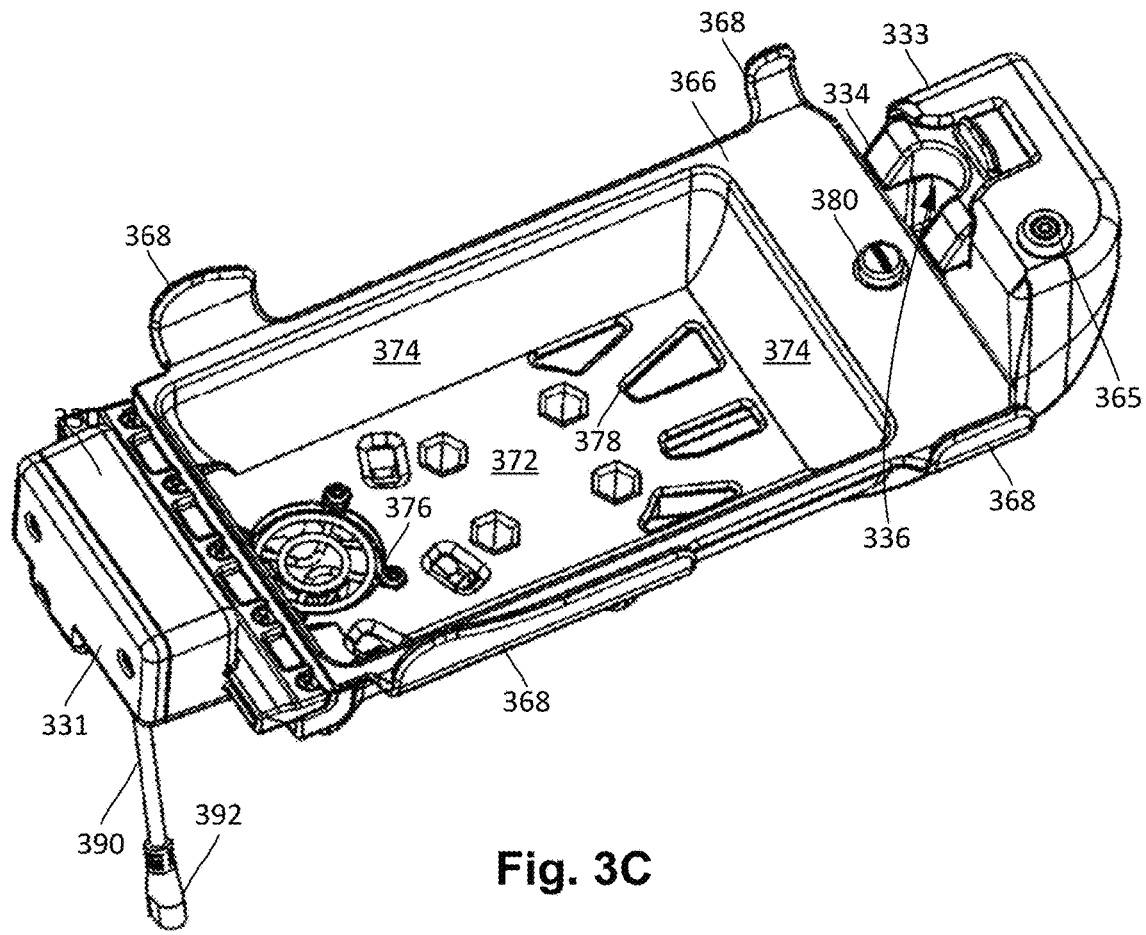
FIG. 3C is a schematic perspective front view of the cradle of FIG. 3A, according to the invention.
Figure 3D:
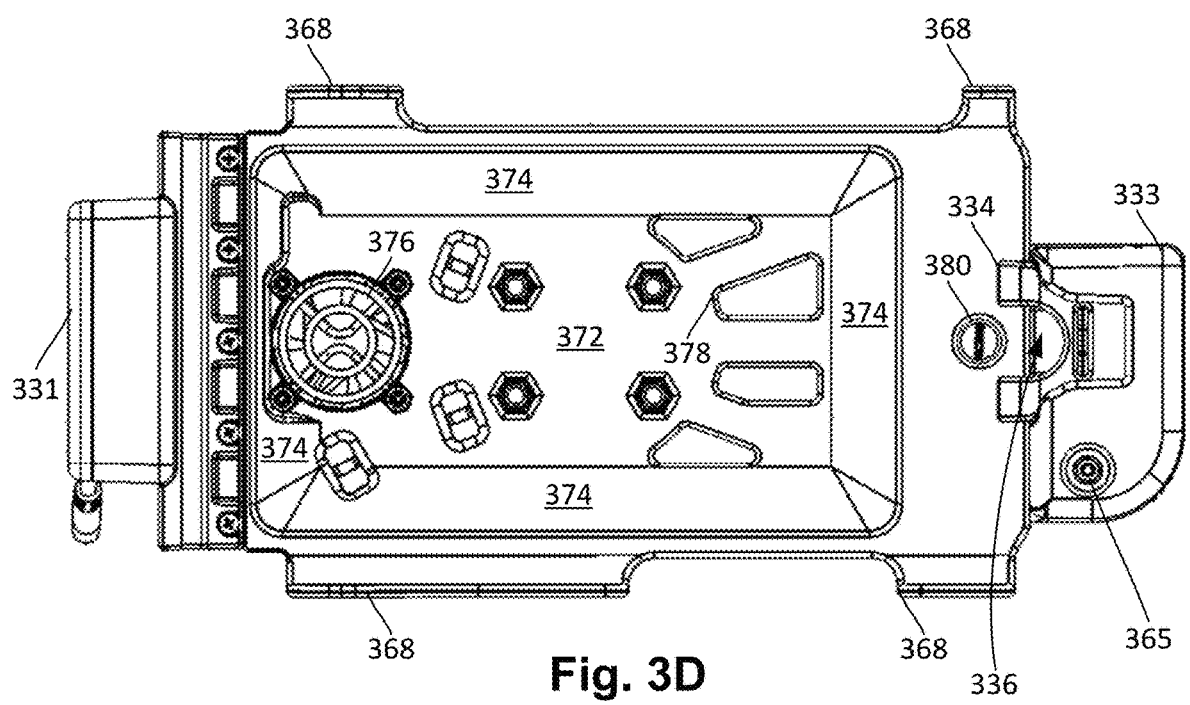
FIG. 3D is a schematic front plan view of the cradle of FIG. 3A, according to the invention.
Figure 3E:
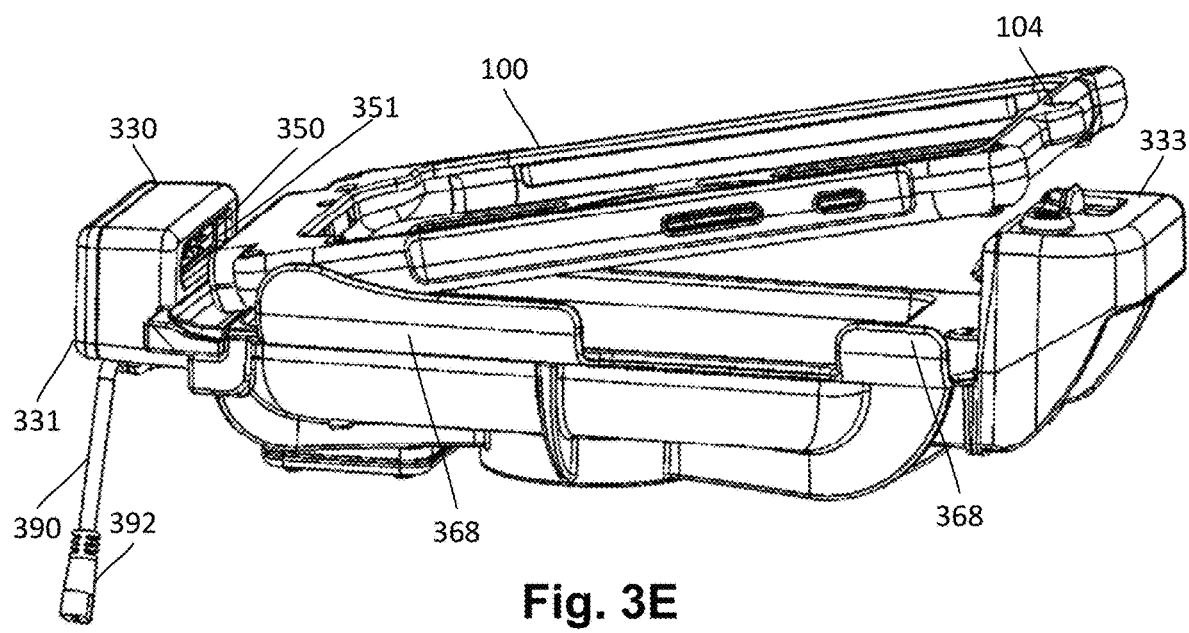
FIG. 3E is a schematic perspective side view of the case being inserted into the cradle of FIG. 3A, according to the invention.
Figure 3F:
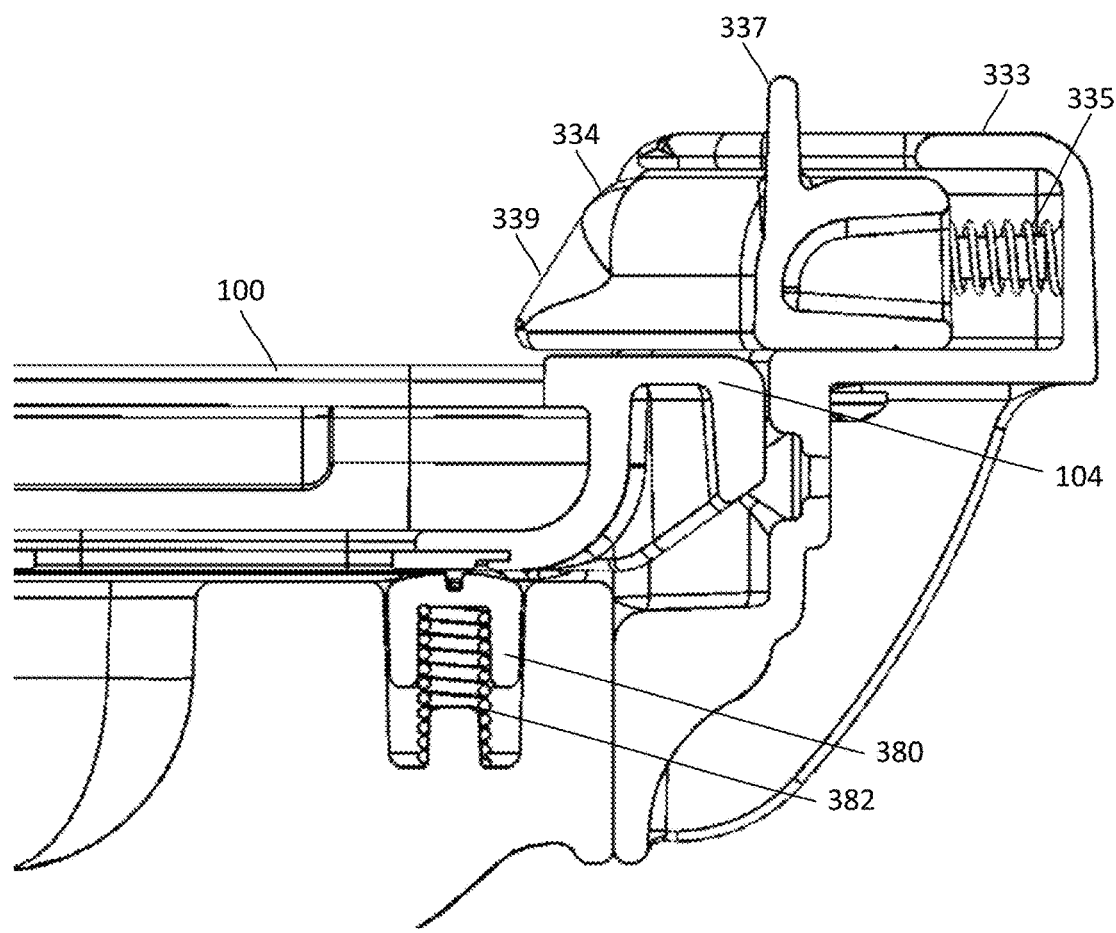
FIG. 3F is a schematic longitudinal cross-sectional view of a top portion of the case and cradle of FIG. 3A, according to the invention.
Figure 3G:
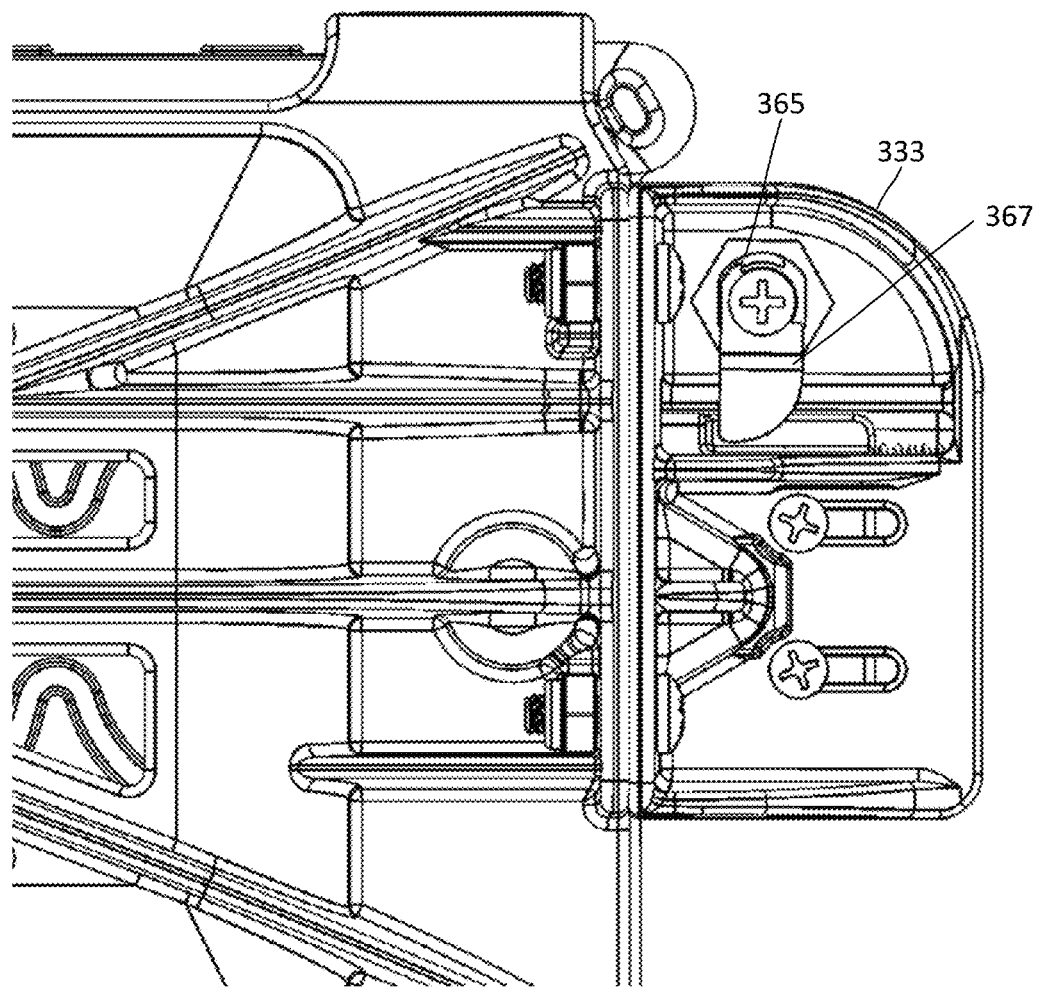
FIG. 3G is a schematic close-up back plan view of a top portion of the case and cradle of FIG. 3A, according to the invention.

FIG. 3A is a front perspective view of one embodiment of the case 100 disposed in one embodiment of a cradle 330 that includes a latch 334 with a guide indentation 336 that, in at least some embodiments, has a shape complementary to the guide protrusion 104 of the case 100. FIG. 3B is a rear perspective view of the cradle 330, FIG. 3C is a front perspective view of the cradle 330 without the case 100, and FIG. 3D is a front plan view of the cradle 330 without the case 100. FIG. 3E illustrates insertion of the case 100 into the cradle 330. FIG. 3F is a lateral cross-sectional view of a portion of the cradle 330 including the latch 334. FIG. 3G is a rear view of a portion of the cradle 330 including the latch 334.

The cradle 330 also includes a connector 331 with contacts 350 (FIG. 3E) configured to electrically couple with the first contacts 108 of the case 100. In at least some embodiments, the connector 331 includes a female socket 351 (FIG. 3E) for receiving the first male structure 112 or second male structure 113 of the case 100. In at least some embodiments, the connector 331 can also include a cord 390 with a plug 392 for coupling to a power or data source (or data receiver) for coupling power or data through the contacts 350. In at least some embodiments, the connector 331 can include external contacts for coupling to a power or data source (or data receiver) for coupling power or data through the contacts 350. In at least some embodiments, the contacts can be biasing contacts, such as pogo pins, that can move up/down when engaged or disengaged.

The cradle 330 includes a latch housing 333 and the latch 334 is slidable relative to the latch housing between a retention position, as illustrated in FIG. 3A, and an unloading/loading position, as illustrated in FIG. 3E. In the retention position, the latch 334 is at least partially disposed over the cover 102 of the case 100 to retain the mobile device and case received in the docking cradle. In the unloading/loading position, the latch 334 is retracted to permit receiving the case 100 and mobile device into, or removing the case and mobile device from, the cradle. In at least some embodiments, the guide protrusion 104 of the case 100 and the guide indentation 336 of the latch 334 of the cradle 330 facilitate laterally guiding the case and mobile device into the cradle when the latch is in the unloading/loading position. In at least some embodiments, the guide protrusion 104 of the case 100 and the guide indentation 336 of the latch 334 of the cradle 330 have complementary shapes. In other embodiments, the guide protrusion 104 of the case 100 and the guide indentation 336 of the latch 334 of the cradle 330 may have different shapes but the guide protrusion fits through the guide indentation when the latch is in the unloading/loading position.

In at least some embodiments, the latch 334 is biased to the retention position using at least one latch biasing element 335 (FIG. 3F), such as a spring, disposed in the latch housing 333. In at least some embodiments, the latch 334 includes a latch handle 337 (FIG. 3F) for manually moving the latch toward the unloading/loading position. In at least some embodiments, the latch 334 has a sloped forward section 339 so that as the case 100 and mobile device are loaded into the cradle 330, the case or mobile device or both can push against the sloped forward section 339 of the latch 334 to slide the latch toward the loading/unloading position to allow the case and mobile device to be loaded into the cradle.

In at least some embodiments, the latch housing 333 includes a locking mechanism 365 that can be used to lock the latch 334 into the retention position. In the illustrated embodiment, the locking mechanism 365 includes a latch stop 367 (FIG. 3G) that can be rotated between a locked position, illustrated in FIG. 3G, that impedes movement of the latch 334 and an unlocked position (not shown) where the latch stop is positioned away from the path of the latch. Other suitable locking mechanisms 365 can also be used. In some embodiments, the locking mechanism 365 can be operated using a key or tool (not shown) or can be a push-button arrangement or any other suitable arrangement for operating the locking mechanism between the locked and unlocked position.

Turning to FIGS. 3C and 3D, in at least some embodiments, the cradle 330 includes a frame 366, a plurality of guide members 368 extending from the frame to guide the receiving of the mobile device into the cradle, a back plate 372 spaced apart from the frame, and sidewalls 374 extending from the frame to the back plate. In other embodiments, the back plate 372 and sidewalls 374 are omitted. In at least some embodiments, the frame 366 is selected for a specific mobile device (or set of mobile devices having a same or similar length and width) and has a length and width selected based on a length and width of the specific mobile device (or set of mobile devices). In at least some embodiments, the latch 334 and latch housing 333 are disposed along one side of the frame 366, the connector 331 is disposed along another side of the frame, and one or more of the guide members 368 are disposed along each of the two remaining sides of the frame. The term "similar" as used herein in the phrase "similar length and width" means varying in length or width by no more than 1%, 5%, or 10%.

In at least some embodiments, a fan 376 is mounted to the back plate 372 to direct cooling air toward the mobile device. In at least some embodiments, openings 378 are made in the back plate 372 or sidewalls 374 or both to allow the air out of the cradle 330.

In at least some embodiments, the cradle 330 includes a plunger 380 extending through the frame 366. The plunger 380 may be biased by a biasing element 382 (FIG. 3F), such as a spring, to extend out of the frame 366 and push against a case 100 or mobile device received in the cradle 330. In at least some embodiments, the biasing of the plunger 380 is sufficient to push a mobile device and case 100 received in the cradle 330 against the latch 334 when the latch is in the locked position. Such an arrangement may, for example, reduce or hinder movement (up-down or side-to-side or both) of the mobile device within the cradle 330.

In at least some embodiments, the back panel 372 (of the frame 366 if there is no back panel) can include a mounting arrangement 384 for attachment of a mount (not shown) to mount the cradle 330 to surface or other article. Non-exhaustive examples of mounts that can be attached to the mounting arrangement 384 are presented at, for example, U.S. Pat. Nos. 5,845,885; 6,561,476; 7,320,450; 7,997,554; 8,454,178; 8,505,861; and 9,831,904, all of which are incorporated herein by reference in their entireties.

Figure 4A:
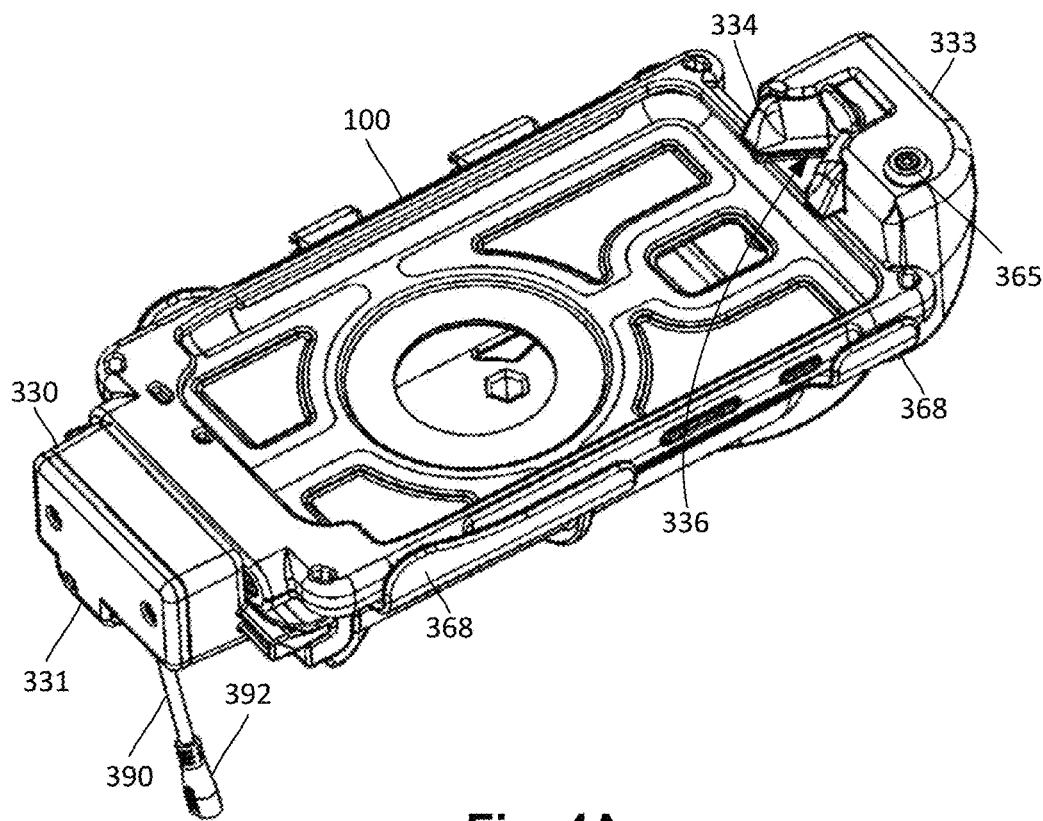
FIG. 4A is a schematic perspective front view of another embodiment of a case in a docking cradle, according to the invention.
Figure 4B:
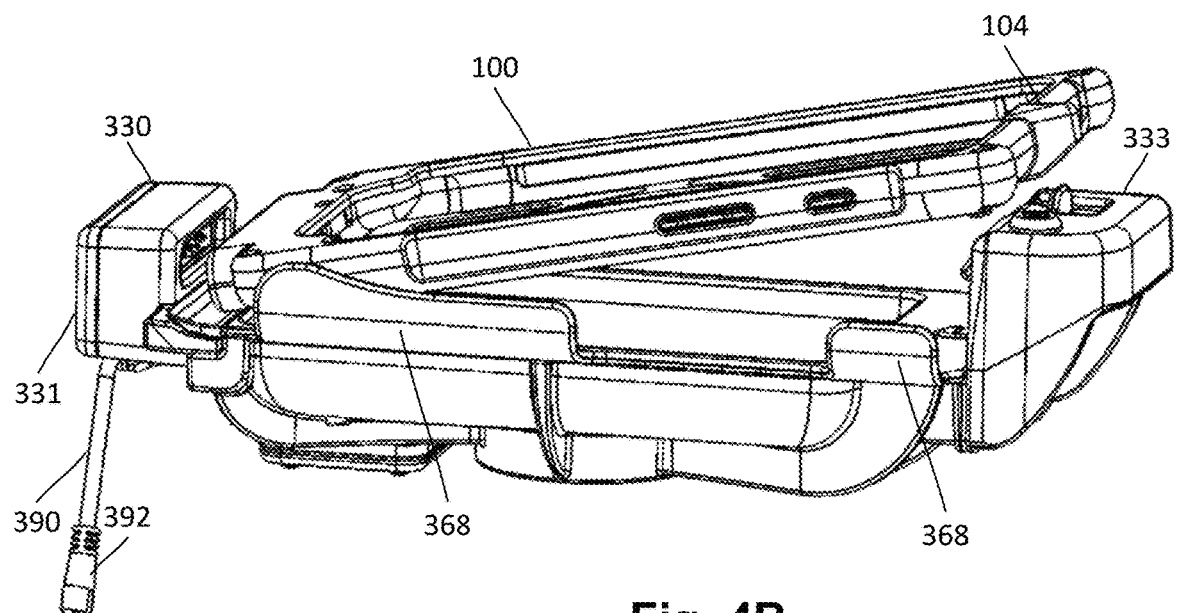
FIG. 4B is a schematic perspective side view of the case being inserted into the cradle of FIG. 4A, according to the invention.
Figure 5A:
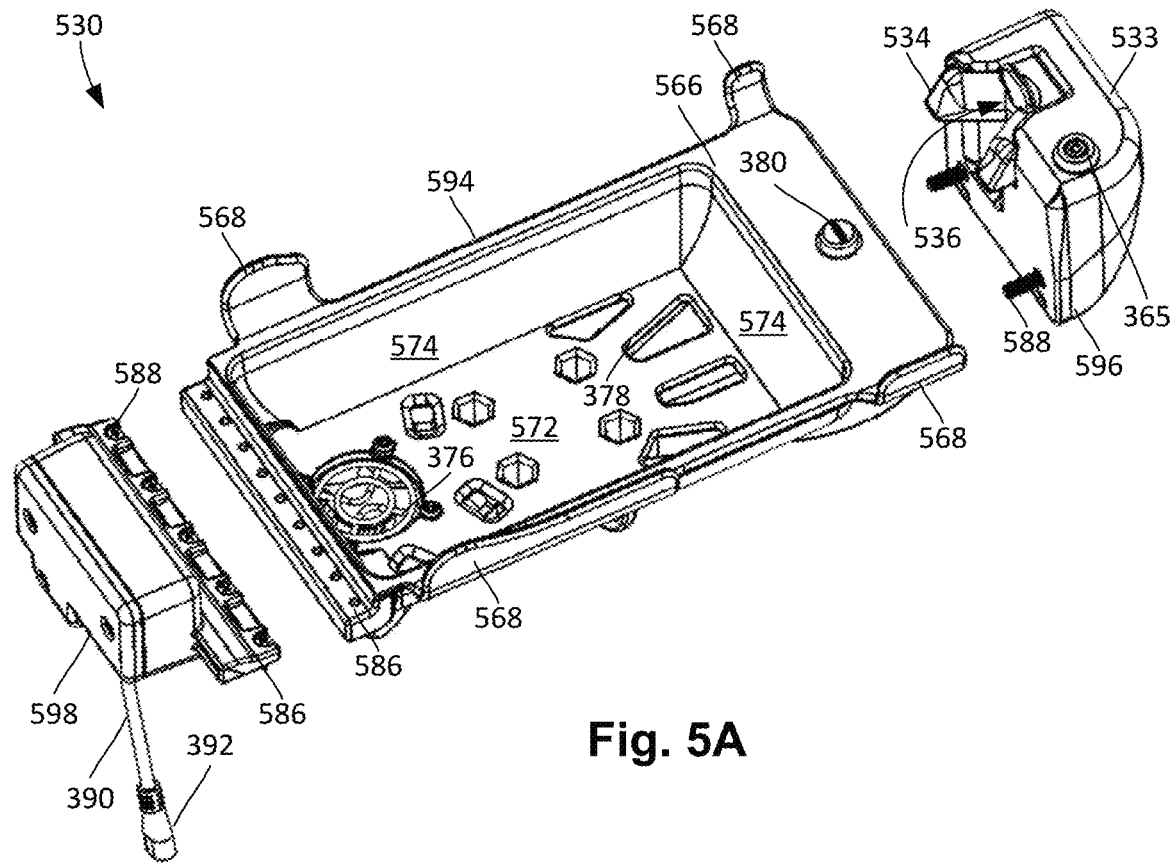
FIG. 5A is a schematic perspective front view of one embodiment of a cradle formed of modular components, according to the invention.
Figure 5B:
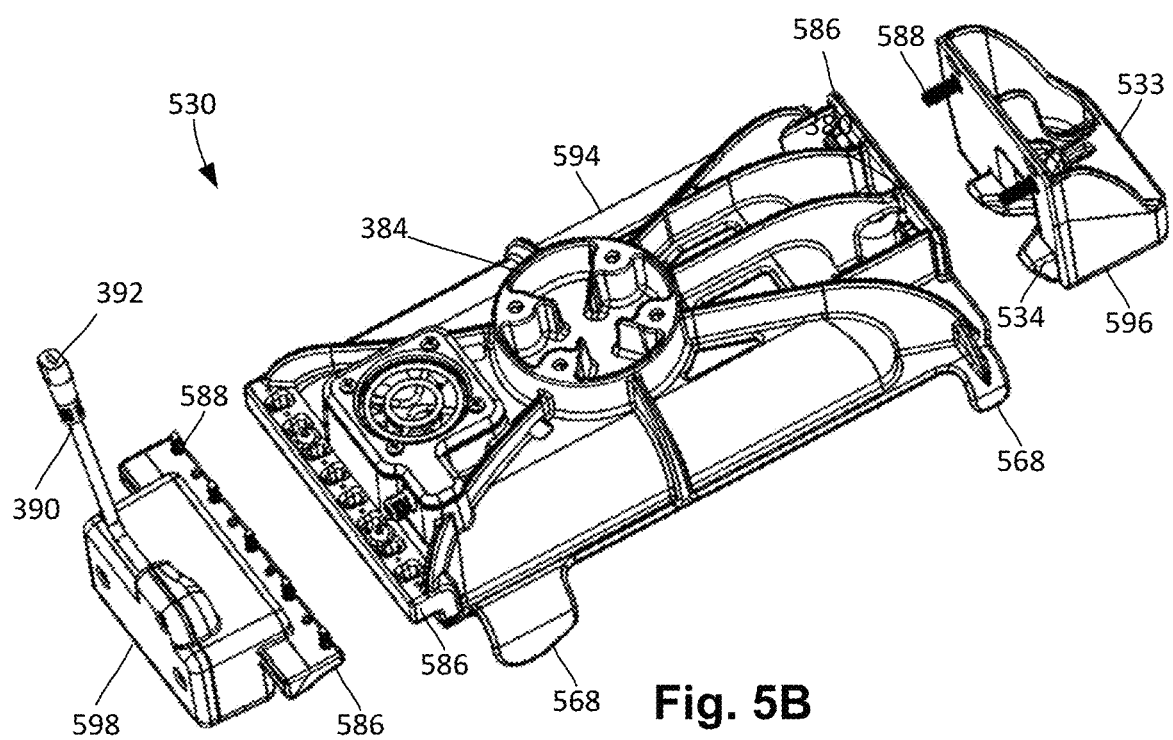
FIG. 5B is a schematic perspective back view of the cradle of FIG. 5A, according to the invention.
Figure 5C:
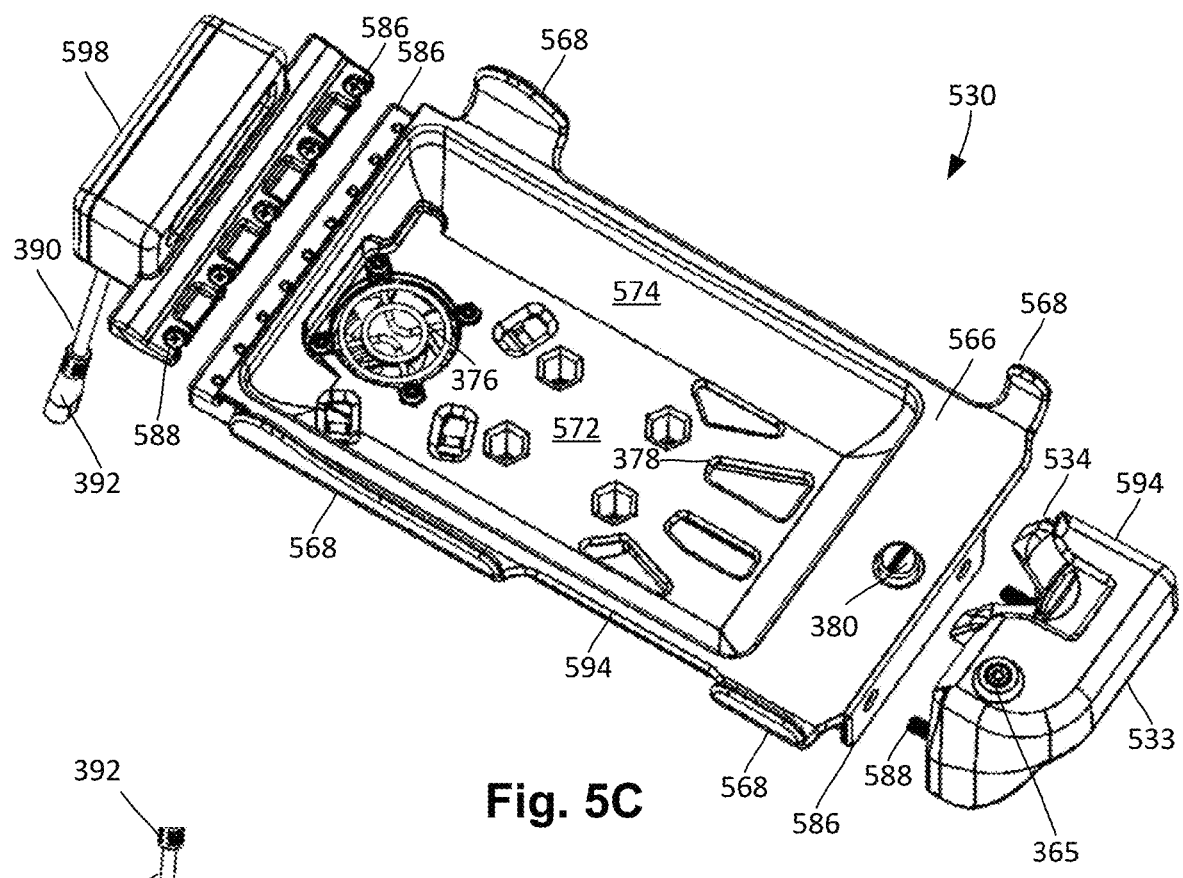
FIG. 5C is a schematic perspective front view of the cradle of FIG. 5A from a different angle, according to the invention.
Figure 5D:
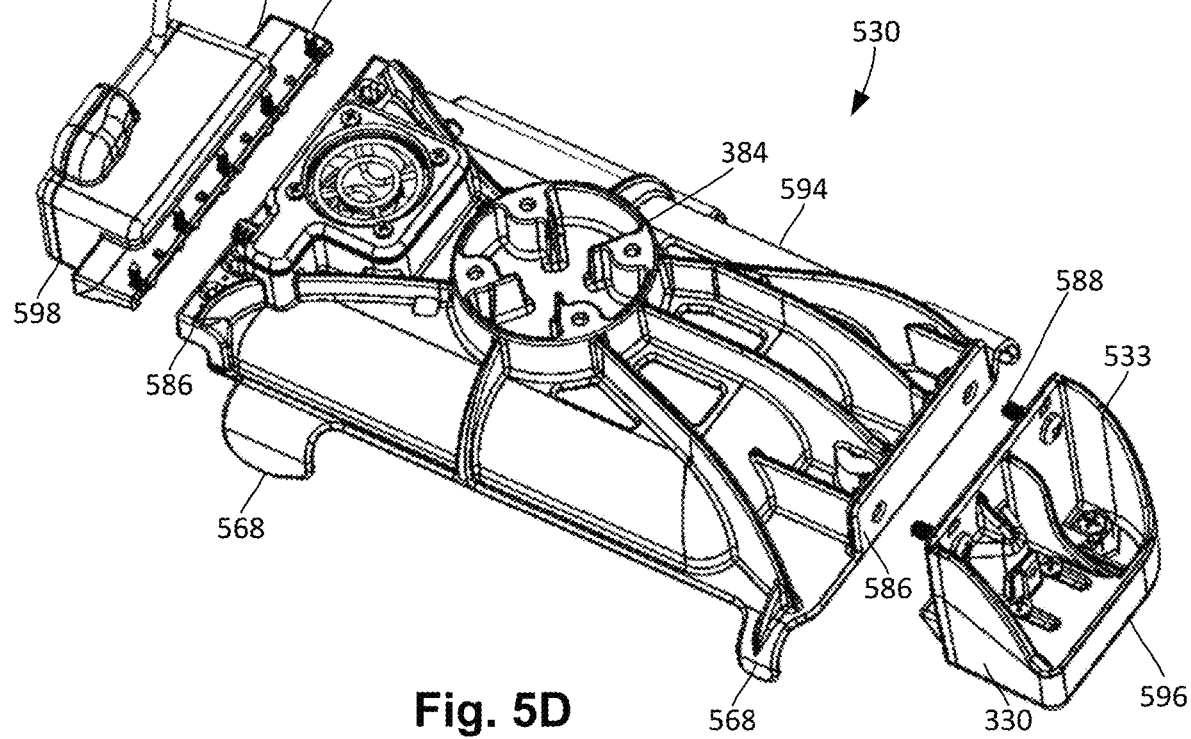
FIG. 5D is a schematic perspective back view of the cradle of FIG. 5A from a different angle, according to the invention.

FIGS. 4A and 4B illustrate another embodiment of a case 100 with a triangular guide protrusion 104 and a cradle 330 with latch 334 have a triangular guide indentation 336.

In at least some embodiments, a cradle 530 can be made from modular components that include one modular component that is specifically sized for the mobile device to be received and two other components are universal and can be used with a wide variety of different mobile devices. FIGS. 5A to 5D illustrate one embodiment of a modular cradle 530 which can be the same as cradle 330 or different from cradle 330. The modular cradle 530 includes a device-specific module 594 configured for receiving a specific mobile device (or set of mobile devices have similar lengths and widths), a universal retention module 596, and a universal connector module 598. The universal retention module 596 and universal connector module 598 are is configured to be removably attached to any of a plurality of different device-specific modules 594 of different length, width, or both length and width. The term "similar" as used herein in the phrase "similar lengths and widths" means varying in length or width by no more than 1%, 5%, or 10%.

The device-specific module 594 can include a frame 566, a plurality of guide members 568 extending from the frame to guide the receiving of the mobile device into the cradle, a back plate 572 spaced apart from the frame, and sidewalls 574 extending from the frame to the back plate. In other embodiments, the back plate 572 and sidewalls 574 are omitted. The frame 566 is selected for a specific mobile device (or set of mobile devices have a same or similar length and width) and has a length and width selected based on a length and width of the specific mobile device (or set of mobile devices). In at least some embodiments, the universal retention module 596 is attached, or attachable, at one side of the frame 566, the universal connector module 598 is attached, or attachable, at another side of the frame, and one or more of the guide members 568 are disposed along each of the two remaining sides of the frame. The device-specific module 594 can include one or more of the fan 376, the openings 378, the plunger 380 (and associated biasing element 382), or the mounting arrangement 384 described above with respect to cradle 330.

The universal retention module 596 is removably attached, or attachable, to the device-specific module 594. The universal retention module 596 includes a latch housing 533 and a latch 534 that is slidable relative to the body between a retention position and an unloading/loading position. In the retention position, the latch 534 is at least partially disposed over the cover 102 of the case 100 to retain the mobile device and case received in the cradle 530. In the unloading/loading position, the latch 534 is retracted to permit receiving the case 100 and mobile device into, or removing the case and mobile device from, the cradle body.

In at least some embodiments, the latch 534 is biased to the retention position as described above with respect to latch 334 of cradle 330 such as, for example, biasing using at least one latch biasing element 335 (FIG. 3F), such as a spring, disposed in the latch housing 533. In at least some embodiments, the latch 534 can include a latch handle 337 as described above with respect to latch 334 of cradle 330. In at least some embodiments, the latch 534 has a sloped forward section as described above with respect to latch 334 of cradle 330. In at least some embodiments, the universal retention module 596 can include a locking mechanism 365 as described above with respect to latch 334 and cradle 330

In at least some embodiments, the latch 534 includes a guide indentation 536 so that the guide protrusion 104 of the case 100 and the guide indentation 536 of the latch 534 of the cradle 530 facilitate laterally guiding the case and mobile device into the docking cradle when the latch is in the unloading/loading position. In at least some embodiments, the guide protrusion 104 of the case 100 and the guide indentation 536 of the latch 534 of the cradle 530 have complementary cross-sectional shapes. In other embodiments, the guide protrusion 104 of the case 100 and the guide indentation 536 of the latch 534 of the cradle 530 may have different cross-sectional shapes but the guide protrusion fits through the guide indentation when the latch is in the unloading/loading position. It will be recognized that the guide indentation 536 is optional and that the cradle 530 can be used with a mobile device or can be used with a mobile device disposed in a case (which case may or may not have a guide protrusion 104.)

The universal connector module 598 is removably attached to the device-specific module 594 and includes a body 597 and a device connector 599 coupled to the body. In at least some embodiments, the device connector 599 is the same or similar to the connector 331. The device connector 599 can include contacts 350 configured to electrically couple with the first contacts 108 of the case 100 (or contacts on a mobile device). In at least some embodiments, the device connector 599 includes a female socket 351 for receiving the first male structure 112 or second male structure 113 of the case 100. In at least some embodiments, the universal connector module 598 can also include a cord 590 with a plug 592 for coupling to a power or data source (or data receiver) for coupling power or data through the contacts 550. In at least some embodiments, the universal connector module 598 can include external contacts for coupling to a power or data source (or data receiver) for coupling power or data through the contacts 550.

The device-specific module 594, the universal retention module 596, and the universal connector module 598 can include one or more coupling plates 586 to couple these modules together using one or more fasteners 588, such as screws, rivets, adhesive, or the like or any combination thereof.

Figure 6A:
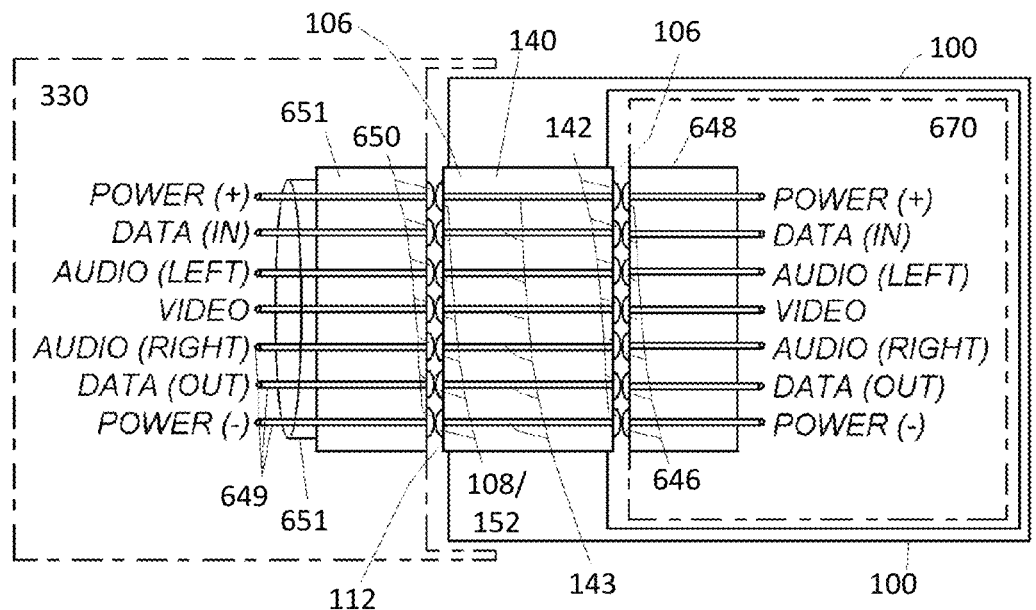
FIG. 6A is a block diagram of a first embodiment of electrical connection between a docking cradle, an adapter of the case of FIG. 1A, and a mobile device when the mobile device is received in the case and the docking cradle is electrically coupled to the adapter of the case, according to the invention.

FIG. 6A is a block diagram of one embodiment of electrical connection between the external device 330, adapter 106, and mobile device 670 when the mobile device is received in the case 100 and the external device is electrically coupled to the adapter of the case. In this embodiment, the first contacts 108 of the adapter are coupled to the second contacts 142 on the male plug 109 through conductors 143 that are sequentially ordered. As illustrated, contacts 646 in a female socket 648 of the mobile device 670 are electrically coupled to the second contacts 142 on the male plug 109 of the adapter and contacts 650 (which are, optionally, in a female connector 651 or other connector) of the external device 330 are coupled to the first contacts 108 of the adapter 106. FIG. 6A illustrates one example of an arrangement 649 of these contacts as assigned to particular inputs/outputs. It will be recognized that other assignments of inputs/outputs or arrangements of assignments of inputs/outputs can be used.

Figure 6B:
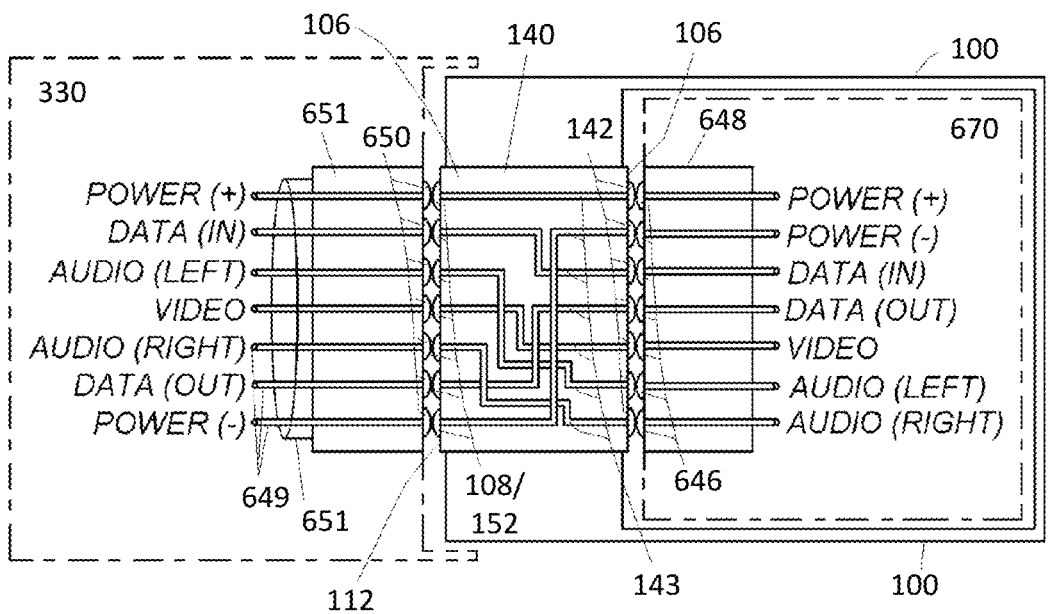
FIG. 6B is a block diagram of a second embodiment of electrical connection between a docking cradle, an adapter of the case of FIG. 1A, and a mobile device when the mobile device is received in the case and the docking cradle device is electrically coupled to the adapter of the case, according to the invention.

FIG. 6B is a block diagram of another embodiment of electrical connection between the external device 330, adapter 106, and mobile device 640. In this embodiment, the first contacts 108 are coupled to the second contacts 142 in a non-sequential relationship with at least some of the conductors 143 overlapping (with intervening insulation). Accordingly, the adapter 106 can be used to couple a specific type of mobile device to a universal external device by rearranging the inputs/outputs from the mobile device to the arrangement of inputs/outputs of the universal external device, such as a docking device or docking cradle. This allows the universal external device to be used with a variety of mobile devices by selection of the appropriate adapter to convert the arrangement of inputs/outputs from the mobile device to the universal external device.

Although FIGS. 6A and 6B illustrate the coupling of the first contacts 108 to the second contacts 142, it will be recognized that a similar arrangement of conductors 143 can be used to couple the contacts 162 of the optional female connector 110 to the second contacts 142 of the male plug 109 of the adapter 106, as illustrated in FIGS. 6A and 6B (using the reference "108/162"). In some embodiments, the female connector 110 is identical to the female socket 648 of the mobile device 640. For example, if the female socket of the mobile device is a USB C type socket, then the female connector is also USB C. In other embodiments, the female connector 110 is a different type or connector, or has a different input/output arrangement, from the female socket 648 of the mobile device 640.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. An arrangement, comprising:
   a case for a mobile device and having an exterior, the case comprising
      a cover defining a cavity configured for receiving and holding the mobile device and comprising a guide protrusion extending away from the cavity and a remainder of the cover; and
      an adapter disposed at least partially within the cover, the adapter comprising a plurality of first contacts disposed on the exterior of the case, a male plug extending into the cavity defined by the cover and configured for insertion into a female socket of the mobile device, and a plurality of second contacts disposed on the male plug and electrically coupled to the first contacts of the adapter; and
   a docking cradle comprising
      a cradle body configured to receive a mobile device disposed in the case;
      a connector disposed on the cradle body, configured to engage the case, and comprising contacts configured to electrically couple to the first contacts of the adapter of the case;
      a latch housing coupled to the cradle body; and
      a latch that is slidable relative to the latch housing between a retention position and an unloading/loading position, wherein the latch, in the retention position, is configured to be at least partially disposed over the cover of the case to retain the mobile device and case received in the docking cradle, wherein the latch, in the unloading/loading position, is configured to permit receiving the mobile device into, or removing the mobile device from, the cradle body, wherein a portion of the latch defines a guide indentation having a shape complementary to the guide protrusion of the cover to laterally guide the case and mobile device into the docking cradle when in the unloading/loading position.

2. The arrangement of claim 1, wherein the guide protrusion has a hemispherical, square, rectangular, hexagonal, octagonal, half-oval, right triangular, equilateral triangular, or isosceles triangular shape.

3. The arrangement of claim 1, wherein the docking cradle further comprises a biasing element disposed in the latch housing to bias the latch in the retention position.

4. The arrangement of claim 1, wherein the docking cradle further comprises a locking mechanism disposed in the latch housing and configured for locking the latch in the retention position.

5. The arrangement of claim 1, wherein the docking cradle further comprises a biased plunger extending from the cradle body and configured to push a mobile device and case received in the cradle body toward the latch.

6. The arrangement of claim 1, wherein the cradle body comprises a frame, a plurality of guide members extending from the frame to guide the receiving of the mobile device, a back plate spaced apart from the frame, and sidewalls extending from the frame to the back plate, wherein the frame has a length and width selected based on a length and width of the mobile device.

7. The arrangement of claim 6, the docking cradle further comprises a fan disposed on the back plate.

8. The arrangement of claim 1, wherein the connector of the docking cradle is a female connector.

9. The arrangement of claim 8, wherein the cover and adapter of the case form a male structure that extends from a remainder of the case, wherein the first contacts are disposed on the male structure.

10. The arrangement of claim 1, wherein the cover of the case is flexible and made from at least one elastomeric polymer.

11. The arrangement of claim 1, wherein the cover of the case comprises a flexible covering and a rigid frame disposed at least partially within the flexible covering.

12. A modular docking cradle for a mobile device, the modular docking cradle comprising:
a device-specific module configured for receiving the mobile device and comprising a frame, a plurality of guide members extending from the frame to guide the receiving of the mobile device, a back plate spaced apart from the frame, and sidewalls extending from the frame to the back plate, wherein the frame has a length and width selected based on a length and width of the mobile device;
a universal retention module removably attached or removably attachable to the device-specific module and comprising a body and a latch that is slidable relative to the body between a retention position and an unloading/loading position, wherein the latch, in the retention position, is configured to engage and retain a mobile device or case disposed on the mobile device, received in the device-specific module, wherein the latch, in the unloading/loading position, is configured to permit receiving the mobile device into, or removing the mobile device from, the device-specific module, wherein the universal retention module is configured to be removably attached to any of a plurality of different device-specific modules of different length or different width or both different length and different width; and
a universal connector module removably attached or removably attachable to the device-specific module and comprising a body and a device connector coupled to the body, wherein the device connector comprises a plurality of contacts configured for electrically coupling to contacts of a connector on the mobile device or on a case disposed on the mobile device, wherein the universal connector module is configured to be removably attached to any of a plurality of different device-specific modules of different length or different width or both different length and different width.

13. The modular docking cradle of claim 12, further comprising a biasing element disposed in a latch housing to bias the latch in the retention position.

14. The modular docking cradle of claim 12, further comprising a locking mechanism disposed in a latch housing and configured for locking the latch in the retention position.

15. The modular docking cradle of claim 12, further comprising a biased plunger extending from the device-specific module and configured to push a mobile device and case received in the device-specific module toward the latch.

16. The modular docking cradle of claim 12, further comprising a fan disposed on the back plate.

17. The modular docking cradle of claim 12, wherein the device connector of the universal connector module is a female connector.

18. The modular docking cradle of claim 12, wherein the frame has a first end, a second end opposite the first end, a first side extending from the first end to the second end, and a second side extending from the first end to the second end and opposite the first side, wherein at least one of the guide members extends from the first side and at least another one of the guide members extends from the second side.

19. The modular docking cradle of claim 18, wherein the universal retention module is removably attached or removably attachable to the first end of the frame and the universal connector module is removably attached or removably attachable to the second end of the frame.

20. The modular docking cradle of claim 12, wherein the latch defines a guide indentation to guide the receiving of the mobile device.

* * * * *